US012619538B2

(12) United States Patent
Liang

(10) Patent No.: US 12,619,538 B2
(45) Date of Patent: May 5, 2026

(54) METHOD FOR DATA PROCESSING, ELECTRONIC DEVICE, AND STORAGE MEDIUM

(71) Applicant: BEIJING BAIDU NETCOM SCIENCE TECHNOLOGY CO., LTD., Beijing (CN)

(72) Inventor: Mingyuan Liang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/967,484

(22) Filed: Dec. 3, 2024

(65) Prior Publication Data

US 2025/0094348 A1 Mar. 20, 2025

(30) Foreign Application Priority Data

Dec. 12, 2023 (CN) .......................... 202311703935.1

(51) Int. Cl.
*G06F 12/0806* (2016.01)
(52) U.S. Cl.
CPC ................................. *G06F 12/0806* (2013.01)
(58) Field of Classification Search
CPC ............. G06F 12/0806; G06F 12/0895; G06F 2209/548; G06F 3/06; G06F 9/546
See application file for complete search history.

(56) References Cited

U.S. PATENT DOCUMENTS

2024/0069808 A1* 2/2024 Bukhari ................ G06F 3/0659
2025/0028664 A1* 1/2025 Zhang .................... G06F 13/30

FOREIGN PATENT DOCUMENTS

CN 113553216 A 10/2021
CN 114546265 A 5/2022
(Continued)

OTHER PUBLICATIONS

First Office Action for Chinese Application No. 202311703935.1, dated Oct. 9, 2024, 11 pgs.

(Continued)

*Primary Examiner* — Jane W Benner
(74) *Attorney, Agent, or Firm* — Kwan & Olynick LLP

(57) ABSTRACT

Data processing method and apparatus, an electronic device, and a storage medium are disclosed, which is in the fields of artificial intelligence, such as distributed storage and cloud computing. The method includes: determining a priority of each placement group in a cache pool respectively, and dividing placement groups with the same priority into a same waiting queue; constructing a target queue which is initially empty, and in response to determining that a supplementary trigger condition is met, determining placement groups to be retrieved based on the principle that a placement group in a waiting queue with higher priority is retrieved first, retrieving the placement groups to be retrieved from the corresponding waiting queue and adding the placement groups to be retrieved to the target queue; and in response to determining that the target queue is not empty, iteratively traversing each placement group in the target queue, wherein when traversing each placement group, the placement group is used as a target placement group respectively, and the number of writable objects is determined as a first quantity, and the first quantity of objects retrieved from the target placement group is written to a backend pool.

20 Claims, 2 Drawing Sheets

(56)                  References Cited

FOREIGN PATENT DOCUMENTS

| CN | 115113824 | A | 9/2022 |
| WO | 2023070935 | A1 | 5/2023 |

OTHER PUBLICATIONS

Yang Qinglin, Wu Guiyong, Zhang Guangyan Efficient caching methods for data in distributed storage systems [J] Big Data, 2021, 7 (2): 147-157, 29 pgs.

* cited by examiner

METHOD FOR DATA PROCESSING, ELECTRONIC DEVICE, AND STORAGE MEDIUM

The present application claims the priority of Chinese Patent Application No. 202311703935.1, filed on Dec. 12, 2023, with the title of "Data Processing Method and Apparatus, Electronic Device, and Storage Medium". The disclosure of the above application is incorporated herein by reference in its entirety.

FIELD OF THE DISCLOSURE

The present disclosure relates to the field of artificial intelligence, in particular, to data processing method and apparatus, an electronic device, and a storage medium in the fields of distributed storage and cloud computing.

BACKGROUND OF THE DISCLOSURE

Existing distributed storage systems, such as high-performance distributed storage (Ceph) systems, typically design layered functions for different hardware medium. For example, frequently accessed data are stored in a cache pool, which usually uses Solid State Disk (SSD) as the storage medium. Infrequently accessed data are written to a backend pool, which typically uses regular Serial Advanced Technology Attachment (SATA) hard drives as the storage medium.

SUMMARY OF THE DISCLOSURE

The present disclosure provides a data processing method and apparatus, an electronic device, and a storage medium.

A method for data processing, including:

determining a priority of each placement group in a cache pool respectively, and dividing placement groups with the same priority into a same waiting queue;

constructing a target queue which is initially empty, and in response to determining that a supplementary trigger condition is met, determining placement groups to be retrieved based on the principle that a placement group in a waiting queue with higher priority is retrieved first, retrieving the placement groups to be retrieved from the corresponding waiting queue and adding the placement groups to be retrieved to the target queue; and in response to determining that the target queue is not empty, iteratively traversing each placement group in the target queue, wherein when traversing each placement group, the placement group is used as a target placement group respectively, and the number of writable objects is determined as a first quantity, and the first quantity of objects retrieved from the target placement group is written to a backend pool.

An electronic device, including:

at least one processor; and a memory communicatively connected with the at least one processor;

wherein the memory stores instructions executable by the at least one processor, and the instructions are executed by the at least one processor to enable the at least one processor to perform a method for data processing, wherein the method for data processing includes:

determining a priority of each placement group in a cache pool respectively, and dividing placement groups with the same priority into a same waiting queue;

constructing a target queue which is initially empty, and in response to determining that a supplementary trigger condition is met, determining placement groups to be retrieved based on the principle that a placement group in a waiting queue with higher priority is retrieved first, retrieving the placement groups to be retrieved from the corresponding waiting queue and adding the placement groups to be retrieved to the target queue; and in response to determining that the target queue is not empty, iteratively traversing each placement group in the target queue, wherein when traversing each placement group, the placement group is used as a target placement group respectively, and the number of writable objects is determined as a first quantity, and the first quantity of objects retrieved from the target placement group is written to a backend pool.

A non-transitory computer readable storage medium with computer instructions stored thereon, wherein the computer instructions are used for causing a method for data processing, wherein the method for data processing comprises:

determining a priority of each placement group in a cache pool respectively, and dividing placement groups with the same priority into a same waiting queue;

constructing a target queue which is initially empty, and in response to determining that a supplementary trigger condition is met, determining placement groups to be retrieved based on a principle that a placement group in a waiting queue with higher priority is retrieved first, retrieving the placement groups to be retrieved from the corresponding waiting queue and adding the placement groups to be retrieved to the target queue; and in response to determining that the target queue is not empty, iteratively traversing each placement group in the target queue, wherein when traversing each placement group, the placement group is used as a target placement group respectively, and the number of writable objects is determined as a first quantity, and the first quantity of objects retrieved from the target placement group is written to a backend pool.

It should be understood that the content described in this section is not intended to identify key or essential features of the embodiments of the present disclosure, nor is it intended to limit the scope of the present disclosure. Other features of the present disclosure will become readily apparent from the following specification.

BRIEF DESCRIPTION OF DRAWINGS

The drawings are used for better understanding the present solution and do not constitute a limitation of the present disclosure. In the drawings.

DETAILED DESCRIPTION OF PREFERRED EMBODIMENTS

The following part will illustrate exemplary embodiments of the present disclosure with reference to the drawings, including various details of the embodiments of the present disclosure for a better understanding. The embodiments should be regarded only as exemplary ones. Therefore, those skilled in the art should appreciate that various changes or modifications can be made with respect to the embodiments described herein without departing from the scope and spirit of the present disclosure. Similarly, for clarity and conciseness, the descriptions of the known functions and mechanisms are omitted in the descriptions below.

Additionally, it should be understood that the term "and/or" in this context merely describes a relationship between associated objects and indicates that there are three possible relationships. For example, A and/or B can mean: A alone, A and B together, or B alone. Furthermore, the character "/" in this context generally indicates that the associated objects are in an "or" relationship.

Figure 1:
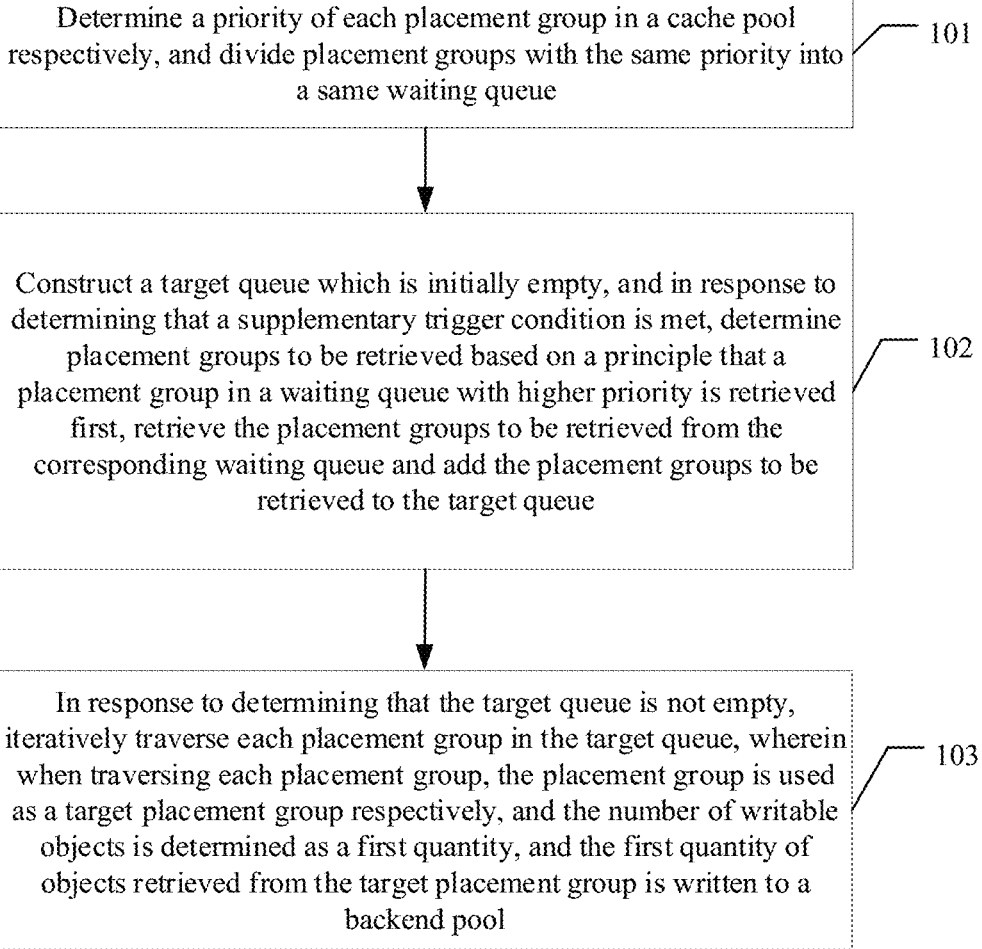
FIG. 1 is a flowchart of the method for data processing according to an embodiment of the present disclosure.

FIG. 1 is a flowchart of the method for data processing according to an embodiment of the present disclosure. As shown in FIG. 1, the following specific implementation methods are included.

In step 101, a priority of each placement group (PG) in a cache pool is determined respectively, and placement groups with the same priority are divided into a same waiting queue.

In step 102, a target queue which is initially empty is constructed, and in response to determining that a supplementary trigger condition is met, PGs to be retrieved are determined based on the principle that a PG in a waiting queue with higher priority is retrieved first, the PGs to be retrieved are retrieved from the corresponding waiting queue and the PGs to be retrieved are added to the target queue.

In step 103, in response to determining that the target queue is not empty, each PG in the target queue is iteratively traversed, wherein when traversing each PG, the PG is used as a target PG respectively, and the number of writable objects is determined as a first quantity, and the first quantity of objects retrieved from the target PG is written to a backend pool.

By implementing the above implementation methods, the scheme of the present disclosure can set priorities and target queues to ensure that objects in high-priority PGs are written to the backend pool first, thereby improving the writing effect. Additionally, by iteratively traversing and writing each PG in the target queue, the pressure balance of the disks in the backend pool can be improved.

A common problem in distributed storage systems is that using ordinary SATA disks for data storage often results in insufficient performance, while using SSDs for long-term data storage is too costly. Therefore, when users write data, it is first written to SSDs and then transferred to SATA disks to balance performance and cost. Frequently accessed data can be stored in the cache pool, which typically uses SSDs as storage medium, and infrequently accessed data can be written to the backend pool, which typically uses SATA disks as the storage medium.

Preferably, in response to determining that the amount of data in the cache pool is greater than a first threshold, it can be determined that the cache pool meets a write trigger condition. The following processing can be performed for each PG in the cache pool respectively: comparing the amount of data in the PG with the reference data amount corresponding to the PG, wherein the reference data amount is a data amount threshold determined based on the first threshold; and determining the priority of the PG based on the comparison result, wherein the larger the ratio of the amount of data in the PG to the reference data amount, the higher the priority of the PG. The specific value of the first threshold can be determined based on actual needs.

The cache pool can include multiple Object Storage Devices (OSDs), each OSD can include multiple PGs, and each PG can include multiple objects.

A first threshold can be set for the cache pool, with the specific value determined based on actual needs. When it is determined that the amount of data in the cache pool is greater than the first threshold, it can be determined that the cache pool meets a write trigger condition, and the priority of each PG in the cache pool can be determined respectively. For any PG, the amount of data in the PG can be compared with the reference data amount corresponding to the PG. For example, the ratio of the amount of data in the PG to the reference data amount can be calculated. The larger the ratio, the higher the priority. In other words, the closer the amount of data in the PG is to the reference data amount, or the more it exceeds, the higher the priority.

The method of determining the reference data amount for different PGs is not limited. For example, if the cache pool includes 10 OSDs, each containing 100 PGs, and the first threshold is set to 100 G, the result obtained by dividing 100 G by 1000 can be used as the reference data amount for each PG.

Accordingly, different PGs can be divided into corresponding waiting queues based on their priority. For example, if there are a total of three priority levels, PGs with priority 1 can be divided into the first waiting queue, PGs with priority 2 can be divided into the second waiting queue, and PGs with priority 3 can be divided into the third waiting queue. The number of priority levels can be determined based on actual needs.

Through the above processing, different PGs can be efficiently and accurately divided into corresponding waiting queues, laying a good foundation for subsequent processing.

Additionally, a target queue which is initially empty can be constructed. When it is determined that the supplementary trigger condition is met each time, a PG to be retrieved can be determined from the unretrieved PGs in each waiting queue based on the principle that PGs in a waiting queue with a higher priority are retrieved first. The PGs to be retrieved can be retrieved from the corresponding waiting queue and then added to the target queue.

Preferably, at least the following two implementation methods can be used:

1) In response to determining that there are no unprocessed PGs in the target queue, it can be determined that the supplementary trigger condition is met. A processed PG is the one when all objects in the PG have been retrieved, and the processed PG will be deleted from the target queue. Accordingly, the PGs in the waiting queue with the highest priority from waiting queues where the placement groups have not been retrieved can be used as the PGs to be retrieved, and the PGs to be retrieved can be retrieved from the corresponding waiting queue and added to the target queue.

For example, if there are three waiting queues in total, in the order of priority from high to low, they are the first waiting queue, the second waiting queue, and the third waiting queue. Since the initially constructed target queue is empty, it can be determined that the supplementary trigger condition is met, i.e., there are no unprocessed PGs in the target queue. Accordingly, each PG in the first waiting queue can be retrieved and added to the target queue. After all PGs in the target queue are processed, it can be determined again that the supplementary trigger condition is met, and each PG in the second waiting queue can be retrieved and added to the target queue. After all PGs in the target queue are processed again, it can be determined once more that the supplementary trigger condition is met, and each PG in the third waiting queue can be retrieved and added to the target queue.

That is, PGs in each waiting queue can be processed in the order of priority from high to low, which is very simple and convenient to implement.

2) In response to determining that the number of unprocessed PGs in the target queue is less than a second threshold, it can be determined that the supplementary trigger condition is met. The completion of the processing includes: all objects have been retrieved, and the processed PG will be deleted from the target queue. Accordingly, in response to determining that it is the first time the supplementary trigger condition is met, each PG in the waiting queue with the highest priority can be used as the PGs to be retrieved. In response to determining that it is not the first time the supplementary trigger condition is met, the number of PGs to be retrieved can be determined as a second quantity, and the second quantity of PGs determined from the unretrieved PGs in each waiting queue based on the above principle can be used as the PGs to be retrieved. Further, the PGs to be retrieved can be retrieved from the corresponding waiting queue and added to the target queue. The specific value of the second threshold can be determined according to actual needs.

Additionally, preferably, the method of determining the number of PGs to be retrieved as the second quantity can include: obtaining the difference between the second threshold and the number of unprocessed PGs in the target queue, and using the difference as the second quantity.

For example, if there are three waiting queues in total, in the order of priority from high to low, they are the first waiting queue, the second waiting queue, and the third waiting queue. Since the initially constructed target queue is empty, it can be determined that the supplementary trigger condition is met, i.e., the number of unprocessed PGs in the target queue is less than the second threshold. Accordingly, each PG in the first waiting queue can be retrieved and added to the target queue. Afterwards, when the number of unprocessed PGs in the target queue is less than the second threshold, it can be determined again that the supplementary trigger condition is met, and the difference between the second threshold and the number of unprocessed PGs in the target queue can be obtained as the second quantity. Accordingly, the second quantity of PGs can be retrieved from the unretrieved PGs in the second waiting queue and added to the target queue. If the number of unretrieved PGs in the second waiting queue is less than the second quantity, all unretrieved PGs in the second waiting queue can be retrieved, and then some PGs can be retrieved from the third waiting queue, so that that the total number of retrieved PGs is equal to the second quantity, and then the second quantity of PGs can be retrieved and added to the target queue, and so on.

The order in which PGs in each waiting queue are sorted is not limited.

In practical applications, the disks in the backend pool corresponding to each PG are usually fixed. Thus, if one or several PGs are always processed, it is equivalent to continuously writing to one or several disks, which can cause the problem of a disk pressure imbalance. After adopting the processing method described in the present disclosure, when the number of unprocessed PGs in the target queue is less than the second threshold, the target queue can be supplemented, so that the number of PGs in the target queue is at least maintained at the second threshold, thereby avoiding the problem of disk pressure imbalance caused by too few PGs in the target queue as much as possible.

For the target queue, as long as it is not empty, each PG in it can be iteratively traversed. When each PG is traversed, it can be used as the target PG, and the number of writable objects can be determined as the first quantity. The first quantity of objects retrieved from the target PG can then be written to the backend pool.

Preferably, the method of retrieving the first quantity of objects from the target PG can include: calling a list thread, using the list thread to retrieve the first quantity of objects from the target PG, and adding the retrieved objects as objects to be written to a write queue. The method of writing to the backend pool can include: in response to determining that the write queue is not empty, writing each object to be processed in the write queue to the backend pool in the order of the time each object was added to the write queue, from first to last.

In traditional methods, PGs in each waiting queue are usually processed in the order of priority from high to low. Moreover, for each waiting queue, the next PG is processed only after the current PG is processed. This results in frequent use of the list thread to retrieve objects from the current PG for writing operations, which leads to excessive pressure on the disks in the backend pool corresponding to the current PG, increasing the problem of disk pressure imbalance. By adopting the processing method described in the present disclosure, each PG in the target queue can be iteratively traversed, and a certain number of objects can be retrieved from each traversed PG and written to the backend pool, thereby improving the balance of disk pressure in the backend pool.

Preferably, the number of unwritten objects to be processed in the write queue can be monitored. In response to determining based on the monitoring result that the number of unwritten objects to be processed is less than or equal to a third threshold, the next PG can be traversed. The third threshold is less than a fourth threshold, and the fourth threshold is the maximum number of objects to be processed that the write queue is allowed to include. The specific values of the third and fourth thresholds can be determined based on actual needs. For example, the fourth threshold can be 20, and the third threshold can be 5.

That is, once it is determined that the number of unwritten objects to be processed in the write queue is less than or equal to the third threshold, the next PG can be traversed. Accordingly, the number of writable objects can be determined as the first quantity, and the first quantity of objects can be retrieved from the unretrieved objects in the traversed PG and added to the write queue.

Preferably, the difference between the fourth threshold and the number of unwritten objects to be processed in the write queue can be obtained, and the difference can be used as the first quantity.

For example, if the fourth threshold is 20 and the number of unwritten objects to be processed in the write queue is 4, then the difference between them, i.e., 16, can be obtained and used as the determined first quantity. The list thread can then be used to retrieve 16 objects from the target PG and add them to the write queue.

It can be seen that, by adopting the above processing method, objects from the target PG can be retrieved using the list thread and added to the write queue, without waiting for the write queue to be empty. This achieves concurrent execution of the list thread and writing operations, thereby improving processing efficiency.

Additionally, preferably, when using the list thread to retrieve the first quantity of objects from the target PG, the list thread can be used to retrieve the top M objects from the objects in the target PG that have not been retrieved. The objects in the target PG are arranged in a predetermined order (the sorting method is not limited), and M is a positive integer greater than or equal to the first quantity. The retrieved M objects need to meet the following condition: after filtering out objects from the M objects with a time difference between the write time and the current time that is less than a fifth threshold, the number of remaining objects equals to the first quantity. The write time refers to the time when the object is written to the cache pool.

The specific value of the fifth threshold can be determined based on actual needs, such as 600 seconds.

Assuming the first quantity is 16 and the number of objects in the target PG that have not been retrieved is 35, then if the top 16 objects in do not include any objects with a time difference between the write time and the current time that is less than the fifth threshold, the top 16 objects can be directly used as the retrieved first quantity of objects and added to the write queue. If the top 16 objects include 2 objects with a time difference between the write time and the current time that is less than the fifth threshold, and the top 18 objects also include only these 2 objects with a time difference between the write time and the current time that is less than the fifth threshold, then the top 18 objects can be retrieved, and the 2 objects with a time difference between the write time and the current time that is less than the fifth threshold can be filtered out. The remaining 16 objects can then be used as the retrieved first quantity of objects and added to the write queue.

It can be seen that, through the above processing, objects with a time difference between the write time and the current time less than the fifth threshold can be retained in the cache pool instead of being written to the backend pool. Objects with a shorter write time are generally more likely to be accessed again, so retaining such objects in the cache pool can improve data access efficiency.

Additionally, preferably, in response to determining that the M objects cannot be retrieved, all objects in the target PG that have not been retrieved can be retrieved, and objects with a time difference between the write time and the current time that is less than the fifth threshold can be filtered out. The remaining objects can be added as objects to be written to the write queue.

For example, if the first quantity is 16 and the number of objects in the target PG that have not been retrieved is 10, then all these 10 objects can be retrieved, objects with a time difference between the write time and the current time less than the fifth threshold can be filtered out, and the remaining objects can be added as objects to be written to the write queue.

Furthermore, preferably, after using the list thread to retrieve objects from the target PG, the list thread can be controlled to enter a sleep state, and the lock corresponding to the target PG occupied by the list thread when retrieving objects can be released.

The list thread needs to occupy the lock corresponding to the target PG when retrieving objects. As mentioned earlier, in traditional methods, the next PG is processed only after the current PG is processed for each waiting queue, which results in frequent use of the list thread to retrieve objects from the current PG for writing operations. This causes the lock corresponding to the current PG to be occupied by the list thread for a long time, preventing users from performing ordinary read and write operations on the current PG.

By adopting the processing method described in the present disclosure, each PG in the target queue can be processed in a manner of iterative traverse manner, and each time an object is retrieved, the lock occupied by the list thread is released in a timely manner, thereby avoiding the problem of a lock being occupied for a long time. This allows sufficient time for ordinary read and write operations, minimizing the issue of slow requests (block ops) due to untimely processing of read and write requests.

It should be noted that for the method embodiments described above, for simplicity of description, they are expressed as a series of action combinations. However, those skilled in the art should understand that the present disclosure is not limited by the described action sequences, as certain steps can be performed in other orders or simultaneously according to the present disclosure. Secondly, those skilled in the art should also understand that the embodiments described in the specification are preferred embodiments, and the actions and modules involved are not necessarily essential to the present disclosure.

The above is an introduction to the method embodiments. The following describes the device embodiments to further illustrate the present disclosure.

Figure 2:
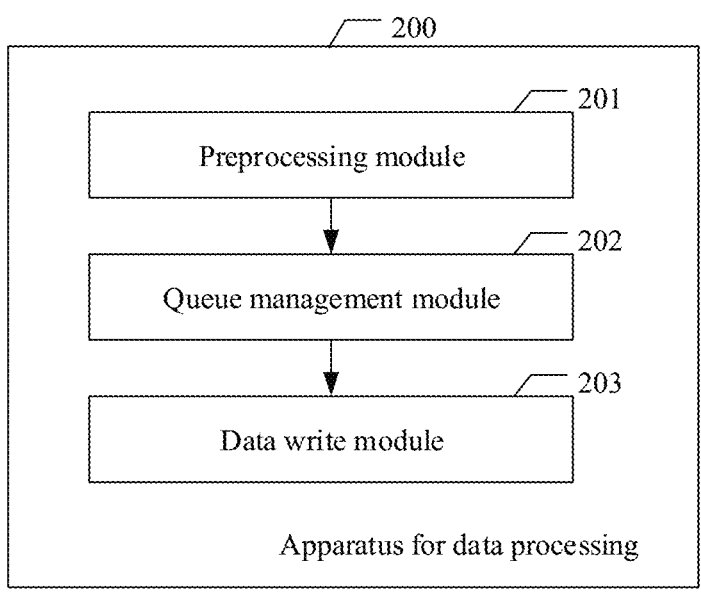
FIG. 2 is a schematic diagram of the structure of an apparatus 200 for data processing according to an embodiment of the present disclosure.

FIG. 2 is a schematic diagram of the composition structure of the data processing device embodiment 200 of the present disclosure. As shown in FIG. 2, it includes: a preprocessing module 201, a queue management module 202, and a data write module 203.

The preprocessing module 201 is configured to determine a priority of each PG in a cache pool respectively and divide PGs with the same priority into a same waiting queue.

The queue management module 202 is configured to construct a target queue which is initially empty, and in response to determining that a supplementary trigger condition is met, determine PGs to be retrieved based on the principle that a PG in a waiting queue with higher priority is retrieved first, retrieve the PGs to be retrieved from the corresponding waiting queue and add the PGs to be retrieved to the target queue.

The data write module 203 is configured to, in response to determining that the target queue is not empty, iteratively traverse each PG in the target queue. When traversing each PG, the PG is used as a target PG respectively, the number of writable objects is determined as a first quantity, and the first quantity of objects retrieved from the target PG is written to the backend pool.

By implementing the above device embodiment, the scheme of the present disclosure can set priorities and target queues to ensure that objects in high-priority PGs are written to the backend pool first, thereby improving the writing effect. Additionally, by iteratively traversing and writing each PG in the target queue, the pressure balance of the disks in the backend pool can be improved.

Preferably, the preprocessing module 201, in response to determining that the amount of data in the cache pool is greater than a first threshold, can determine that the cache pool meets a write trigger condition. For each PG in the cache pool, the following processing can be performed respectively: comparing the amount of data in the PG with the reference data amount corresponding to the PG, where the reference data amount is a data amount threshold determined based on the first threshold; and determining a priority of the PG is based on the comparison result, where the larger the ratio of the amount of data in the PG to the reference data amount, the higher the priority of the PG.

Additionally, the queue management module 202 can construct a target queue which is initially empty. When it is determined that the supplementary trigger condition is met each time, a PG to be retrieved can be determined from the unretrieved PGs in each waiting queue based on the principle that PGs in a waiting queue with a higher priority are retrieved first. The PGs to be retrieved can be retrieved from the corresponding waiting queue and then then added to the target queue.

Preferably, the queue management module 202, in response to determining that there are no unprocessed PGs in the target queue, can determine that the supplementary trigger condition is met. A processed PG is the one when all objects in the PG have been retrieved, and the processed PG will be deleted from the target queue. Accordingly, the PGs in the waiting queue where PGs has not been retrieved and in the waiting queue with the highest priority can be used as the PGs to be retrieved, and the PGs to be retrieved can be retrieved from the corresponding waiting queue and added to the target queue.

Alternatively, preferably, the queue management module 202, in response to determining that the number of unprocessed PGs in the target queue is less than a second threshold, can determine that the supplementary trigger condition is met. The completion of the processing includes: all objects have been retrieved. Accordingly, in response to determining that it is the first time the supplementary trigger condition is met, each PG in the waiting queue with the highest priority can be used as the PGs to be retrieved. In response to determining that it is not the first time the supplementary trigger condition is met, the number of PGs to be retrieved can be determined as a second quantity, and the second quantity of PGs determined from the unretrieved PGs in each waiting queue based on the above principle can be used as the PGs to be retrieved. Further, the PGs to be retrieved can be retrieved from the corresponding waiting queue and added to the target queue.

Additionally, preferably, the queue management module 202 can determine the number of PGs to be retrieved as the second quantity, by obtaining the difference between the second threshold and the number of unprocessed PGs in the target queue, and using the difference as the second quantity.

For the target queue, as long as it is not empty, the data write module 203 can iteratively traverse each PG in it. When each PG is traversed, it can be used as the target PG, and the number of writable objects can be determined as the first quantity. The first quantity of objects retrieved from the target PG can then be written to the backend pool.

Preferably, the data write module 203 can retrieve the first quantity of objects from the target PG by calling a list thread, using the list thread to retrieve the first quantity of objects from the target PG, and adding the retrieved objects as objects to be written to a write queue. The method of writing to the backend pool can include: in response to determining that the write queue is not empty, writing each object to be processed in the write queue to the backend pool in the order of the time each object was added to the write queue, from first to last.

Preferably, the data write module 203 can monitor the number of unwritten objects to be processed in the write queue. In response to determining based on the monitoring result that the number of unwritten objects to be processed is less than or equal to a third threshold, the next PG can be traversed. The third threshold is less than a fourth threshold, and the fourth threshold is the maximum number of objects to be processed that the write queue is allowed to include.

Preferably, the data write module 203 can obtain the difference between the fourth threshold and the number of unwritten objects to be processed in the write queue, and use the difference as the first quantity.

Additionally, preferably, when using the list thread to retrieve the first quantity of objects from the target PG, the data write module 203 can use the list thread to retrieve the top M objects from the unretrieved objects in the target PG that have not been retrieved. The objects in the target PG are arranged in a predetermined order, and M is a positive integer greater than or equal to the first quantity. The retrieved M objects need to meet the following condition: after filtering out objects from the M objects with a time difference between the write time and the current time that is less than a fifth threshold, the number of remaining objects equals the first quantity.

Preferably, the data write module 203, in response to determining that the M objects cannot be retrieved, can retrieve all objects in the target PG that have not been retrieved, and filter out objects with a time difference between the write time and the current time that is less than the fifth threshold. The remaining objects can be added as objects to be written to the write queue.

Additionally, preferably, after using the list thread to retrieve objects from the target PG, the data write module 203 can control the list thread to enter a sleep state and release the lock corresponding to the target PG occupied by the list thread when retrieving objects.

The specific workflow of the device embodiment shown in FIG. 2 can refer to the relevant descriptions in the method embodiments mentioned earlier and will not be repeated here.

The scheme described in the present disclosure can be applied in the field of artificial intelligence, particularly in areas such as distributed storage and cloud computing. Artificial intelligence is a discipline that studies how to make computers simulate certain thought processes and intelligent behaviors (such as learning, reasoning, thinking, planning, etc.) of humans. It involves both hardware and software technologies. Artificial intelligence hardware technologies generally include sensors, dedicated AI chips, cloud computing, distributed storage, big data processing, etc. Artificial intelligence software technologies mainly include computer vision technology, speech recognition technology, natural language processing technology, machine learning/deep learning, big data processing technology, knowledge graph technology, and other major directions.

Furthermore, in the technical solutions of the present disclosure, the collection, storage, use, processing, transmission, provision, and disclosure of user personal information are all in compliance with relevant laws and regulations and do not violate public order and good customs.

According to the embodiments of the present disclosure, the present disclosure also provides an electronic device, a readable storage medium, and a computer program product.

Figure 3:
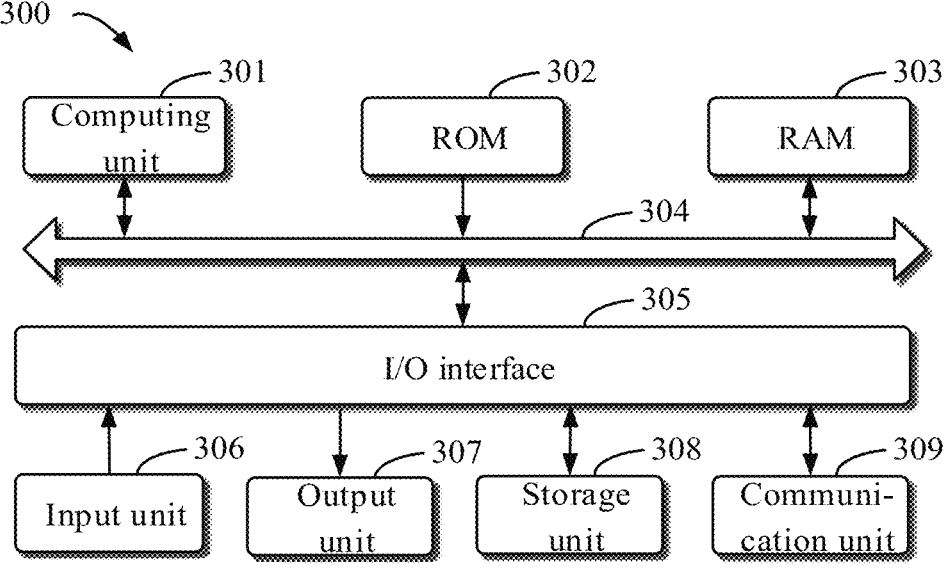
FIG. 3 shows a schematic block diagram of an electronic device 300 that can be used to implement the embodiments of the present disclosure.

FIG. 3 is a block diagram of an electronic device for implementing the method of audio generation based on a large language model according to the embodiments of the present application. The electronic device is intended to represent various forms of digital computers, such as laptop computers, desktop computers, workstations, personal digital assistants, servers, blade servers, mainframe computers, and other suitable computers. The electronic device can also represent various forms of mobile devices, such as personal digital assistants, cellular phones, smartphones, wearable devices, and other similar computing devices. The components shown in the figure, their connections and relationships, and their functions are merely examples and are not intended to limit the implementation of the present application as described and/or claimed herein.

As shown in FIG. 3, the device 300 includes a computing unit 301, which can perform various appropriate actions and processing according to the computer program stored in the read-only memory (ROM) 302 or the computer program loaded from the storage unit 308 into the random access memory (RAM) 303. Various programs and data required for the operation of the device 300 can also be stored in the RAM 303. The computing unit 301, ROM 302, and RAM 303 are interconnected via a bus 304. The input/output (I/O) interface 305 is also connected to the bus 304.

A plurality of components of the device 300 are connected to the I/O interface 305, including: an input unit 306, such as a keyboard, mouse, etc.; an output unit 307, such as various types of displays, speakers, etc.; a storage unit 308, such as disks, optical discs, etc.; and a communication unit 309, such as a network card, modem, wireless communication transceiver, etc. The communication unit 309 allows the device 300 to exchange information/data with other devices through computer networks such as the Internet and/or various telecommunications networks.

The computing unit 301 can be various general-purpose and/or special-purpose processing components with processing and computing capabilities. Examples of the computing unit 301 include, but are not limited to, central processing units (CPUs), graphics processing units (GPUs), various special-purpose artificial intelligence (AI) computing chips, various computing units running machine learning model algorithms, digital signal processors (DSPs), and any appropriate processors, controllers, microcontrollers, etc. The computing unit 301 executes the various methods and processes described above, such as the audio generation method based on a large language model. For example, in some embodiments, the audio generation method based on a large language model can be implemented as a computer software program tangibly contained in a machine-readable medium, such as the storage unit 308. In some embodiments, part or all of the computer program can be loaded and/or installed on the device 300 via the ROM 302 and/or the communication unit 309. When the computer program is loaded into the RAM 303 and executed by the computing unit 301, one or more steps of the audio generation method based on a large language model described above can be executed. Alternatively, in other embodiments, the computing unit 301 can be configured to execute the audio generation method based on a large language model by any other suitable means, such as firmware.

Various embodiments of the systems and techniques described herein can be implemented in digital electronic circuitry, integrated circuits, field-programmable gate arrays (FPGAs), application-specific integrated circuits (ASICs), application-specific standard products (ASSPs), system-on-a-chip systems (SOCs), complex programmable logic devices (CPLDs), computer hardware, firmware, software, and/or combinations thereof. These various embodiments can include: implementation in one or more computer programs, which can be executed and/or interpreted on a programmable system including at least one programmable processor, which can be a special-purpose or general-purpose programmable processor, receiving data and instructions from a storage system, at least one input device, and at least one output device, and transmitting data and instructions to the storage system, the at least one input device, and the at least one output device.

Program code for implementing the methods of the present disclosure can be written in any combination of one or more programming languages. The program code can be provided to a general-purpose computer, special-purpose computer, or other programmable audio generation apparatus based on a large language model for processing or controlling, such that the program code, when executed by the processor or controller, causes the functions/operations specified in the flowcharts and/or block diagrams to be implemented. The program code can be fully executed on the machine, partially executed on the machine, partially executed on the machine and partially on a remote machine, or fully executed on a remote machine or server.

In the context of the present disclosure, a machine-readable medium can be a tangible medium that can contain or store a program for use by or in connection with an instruction execution system, apparatus, or device. The machine-readable medium can be a machine-readable signal medium or a machine-readable storage medium. The machine-readable medium can include, but is not limited to, electronic, magnetic, optical, electromagnetic, infrared, or semiconductor systems, apparatus, or devices, or any suitable combination thereof. More specific examples of machine-readable storage medium would include an electrical connection based on one or more wires, a portable computer disk, a hard disk, random access memory (RAM), read-only memory (ROM), erasable programmable read-only memory (EPROM or flash memory), optical fiber, a portable compact disc read-only memory (CD-ROM), an optical storage device, a magnetic storage device, or any suitable combination thereof.

To provide interaction with a user, the systems and techniques described herein can be implemented on a computer having a display device (e.g., a CRT (cathode ray tube) or LCD (liquid crystal display) monitor) for displaying information to the user; a keyboard and a pointing device (e.g., a mouse or a trackball) by which the user can provide input to the computer. Other types of devices can also be used to provide interaction with the user; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a backend component (e.g., as a data server), or a middleware component (e.g., an application server), or a frontend component (e.g., a user computer with a graphical user interface or a web browser through which a user can interact with the implementation of the systems and techniques described herein), or any combination of such backend, middleware, or frontend components. The components of the system can be interconnected by any form or medium of digital data communication (e.g., a communication network). Examples of communication networks include a local area network (LAN), a wide area network (WAN), and the Internet.

The computing system can include clients and servers. Clients and servers generally operate remotely from each other and typically interact through a communication network. The relationship between clients and servers is produced by running corresponding computer programs on respective computers that have a client-server relationship. A server can be a cloud server, also known as a cloud computing server or cloud host, which is a host product in the cloud computing service system, addressing the shortcomings of traditional physical hosts and VPS services ("Virtual Private Server," or simply "VPS") in terms of management difficulty and weak business scalability. The server can also be a server in a distributed system or a server combined with blockchain technology.

It should be understood that various forms of processes shown above can be used, with steps reordered, added, or deleted. For example, the steps described in the present disclosure can be executed in parallel, sequentially, or in different orders, as long as the desired results of the technical solution disclosed in the present disclosure are achieved, and this is not limited herein.

The specific embodiments described above do not constitute a limitation on the scope of protection of the present disclosure. Those skilled in the art should understand that various modifications, combinations, sub-combinations, and substitutions can be made according to design requirements and other factors. Any modifications, equivalent substitutions, and improvements made within the spirit and principle of the present disclosure shall be included within the scope of protection of the present disclosure.

What is claimed is:

1. A method for data processing, comprising:
determining a priority of each placement group in a cache pool respectively, and dividing placement groups with the same priority into a same waiting queue;
constructing a target queue which is initially empty, and in response to determining that a supplementary trigger condition is met, determining placement groups to be retrieved based on a principle that a placement group in a waiting queue with higher priority is retrieved first, retrieving the determined placement groups from its corresponding waiting queue and adding the retrieved placement groups to the target queue; and
in response to determining that the target queue is not empty, iteratively traversing each placement group in the target queue, wherein when traversing each placement group, the placement group is used as a target placement group respectively, and a first quantity of writable objects is determined, and the first quantity of writable objects retrieved from the target placement group is written to a backend pool.

2. The method of claim 1, wherein:
the determining the priority of each placement group in the cache pool respectively comprises: in response to determining that an amount of data in the cache pool is greater than a first threshold, determining that the cache pool meets a write trigger condition, and performing the following processing for each placement group in the cache pool respectively: comparing the amount of data in the placement group with a reference data amount corresponding to the placement group, the reference data amount being a data amount threshold determined based on the first threshold, and determining the priority of the placement group based on the comparison result, wherein the larger the ratio of the amount of data in the placement group to the reference data amount, the higher the priority of the placement group.

3. The method of claim 1, wherein:
the response to determining that the supplementary trigger condition is met comprises: in response to determining that there are no unprocessed placement groups in the target queue, determining that the supplementary trigger condition is met, wherein a processed placement group is the one when all objects in the placement group have been retrieved, and the processed placement group is deleted from the target queue;
the determining the placement group to be retrieved comprises: using placement groups in the waiting queue with a highest priority from waiting queues where the placement groups have not been retrieved as the placement groups to be retrieved.

4. The method of claim 1, wherein:
the response to determining that the supplementary trigger condition is met comprises: in response to determining that a number of unprocessed placement groups in the target queue is less than a second threshold, determining that the supplementary trigger condition is met, wherein the completion of the processing comprises: all objects have been retrieved, and the processed placement group is deleted from the target queue;
the determining the placement groups to be retrieved comprises: in response to determining that it is a first time the supplementary trigger condition is met, retrieving from the waiting queue by selecting a highest priority placement group, and in response to determining that it is not the first time the supplementary trigger condition is met, determining a second quantity of placement groups to be retrieved, and using the second quantity of placement groups determined from the unretrieved placement groups in each waiting queue based on the principle as the placement groups to be retrieved.

5. The method of claim 4, wherein:
the determining the second quantity of placement groups to be retrieved comprises: obtaining a difference between the second threshold and the number of unprocessed placement groups in the target queue, and using the difference as the second quantity.

6. The method of claim 1, wherein:
the retrieving the first quantity of writable objects from the target placement group comprises: calling a list thread, using the list thread to retrieve the first quantity of writable objects from the target placement group, and adding the retrieved objects as objects to be written to a write queue;
the writing to the backend pool comprises: in response to determining that the write queue is not empty, writing each object to be processed in the write queue to the backend pool in the order of a time each object was added to the write queue, from first to last.

7. The method of claim 6, wherein the iteratively traversing each placement group in the target queue comprises:
monitoring a number of unwritten objects to be processed in the write queue, and in response to determining that the number of unwritten objects to be processed is less than or equal to a third threshold, traversing the next placement group, wherein the third threshold is less than a fourth threshold, and the fourth threshold is a maximum number of objects to be processed that the write queue is allowed to include.

8. The method of claim 7, wherein the determining the first quantity of writable objects, comprises:
obtaining a difference between the fourth threshold and the number of unwritten objects to be processed, and using the difference as the first quantity.

9. The method of claim 6, wherein:
the using the list thread to retrieve the first quantity of writable objects from the target placement group comprises: using the list thread to retrieve M objects from the target placement group that are unretrieved, wherein the objects in the target placement group are arranged in a predetermined order, M is a positive integer greater than or equal to the first quantity, and the retrieved M objects meet the following condition: after filtering out objects from the M objects with a time difference between a write time and a current time that is less than a fifth threshold, a number of remaining objects equals the first quantity;

further comprising: in response to determining that the M objects cannot be retrieved, retrieving all unretrieved objects from the target placement group, filtering out objects with time difference between the write time and the current time that is less than the fifth threshold, and adding the remaining objects as objects to be written to the write queue.

10. The method of claim 9, further comprising:

after using the list thread to retrieve objects from the target placement group, controlling the list thread to enter a sleep state, and releasing a lock corresponding to the target placement group occupied by the list thread when retrieving objects from the target placement group.

11. An electronic device, comprising:

at least one processor; and a memory communicatively connected with the at least one processor;

wherein the memory stores instructions executable by the at least one processor, and the instructions are executed by the at least one processor to enable the at least one processor to perform a method for data processing, wherein the method for data processing comprises:

determining a priority of each placement group in a cache pool respectively, and dividing placement groups with the same priority into a same waiting queue;

constructing a target queue which is initially empty, and in response to determining that a supplementary trigger condition is met, determining placement groups to be retrieved based on a principle that a placement group in a waiting queue with higher priority is retrieved first, retrieving the determined placement groups from its corresponding waiting queue and adding the retrieved placement groups to the target queue; and in response to determining that the target queue is not empty, iteratively traversing each placement group in the target queue, wherein when traversing each placement group, the placement group is used as a target placement group respectively, and a first quantity of writable objects is determined, and the first quantity of writable objects retrieved from the target placement group is written to a backend pool.

12. The electronic device of claim 11, wherein:

the determining the priority of each placement group in the cache pool respectively comprises: in response to determining that an amount of data in the cache pool is greater than a first threshold, determining that the cache pool meets a write trigger condition, and performing the following processing for each placement group in the cache pool respectively: comparing the amount of data in the placement group with a reference data amount corresponding to the placement group, the reference data amount being a data amount threshold determined based on the first threshold, and determining the priority of the placement group based on the comparison result, wherein the larger the ratio of the amount of data in the placement group to the reference data amount, the higher the priority of the placement group.

13. The electronic device of claim 11, wherein:

the response to determining that the supplementary trigger condition is met comprises: in response to determining that there are no unprocessed placement groups in the target queue, determining that the supplementary trigger condition is met, wherein a processed placement group is the one when all objects in the placement group have been retrieved, and the processed placement group is deleted from the target queue;

the determining the placement group to be retrieved comprises: using placement groups in the waiting queue with a highest priority from waiting queues where the placement groups have not been retrieved as the placement groups to be retrieved.

14. The electronic device of claim 11, wherein:

the response to determining that the supplementary trigger condition is met comprises: in response to determining that a number of unprocessed placement groups in the target queue is less than a second threshold, determining that the supplementary trigger condition is met, wherein the completion of the processing comprises: all objects have been retrieved, and the processed placement group is deleted from the target queue;

the determining the placement groups to be retrieved comprises: in response to determining that it is a first time the supplementary trigger condition is met, retrieving from the waiting queue by selecting a highest priority placement group, and in response to determining that it is not the first time the supplementary trigger condition is met, determining a second quantity of placement groups to be retrieved, and using the second quantity of placement groups determined from the unretrieved placement groups in each waiting queue based on the principle as the placement groups to be retrieved.

15. The electronic device of claim 14, wherein:

the determining the second quantity of placement groups to be retrieved comprises: obtaining a difference between the second threshold and the number of unprocessed placement groups in the target queue, and uses the difference as the second quantity.

16. The electronic device of claim 11, wherein;

the retrieving the first quantity of writable objects from the target placement group comprises: calling a list thread, use the list thread to retrieve the first quantity of writable objects from the target placement group, and adding the retrieved objects as objects to be written to a write queue;

the writing to the backend pool comprises: in response to determining that the write queue is not empty, writing each object to be processed in the write queue to the backend pool in the order of a time each object was added to the write queue, from first to last.

17. The electronic device of claim 16, wherein the iteratively traversing each placement group in the target queue comprises:

monitoring a number of unwritten objects to be processed in the write queue, and in response to determining that the number of unwritten objects to be processed is less than or equal to a third threshold, traversing the next placement group, wherein the third threshold is less than a fourth threshold, and the fourth threshold is a maximum number of objects to be processed that the write queue is allowed to include.

18. The electronic device of claim 17, wherein the determining the first quantity of writable objects comprises:

obtaining a difference between the fourth threshold and the number of unwritten objects to be processed, and using the difference as the first quantity.

19. The electronic device of claim 16, wherein:

the using the list thread to retrieve the first quantity of writable objects from the target placement group comprises: using the list thread to retrieve M objects the target placement group that are unretrieved, wherein the objects in the target placement group are arranged in a predetermined order, M is a positive integer greater than or equal to the first quantity, and the retrieved M objects meet the following condition: after filtering out objects from the M objects with a time difference between a write time and a current time that is less than a fifth threshold, a number of remaining objects equals the first quantity;

further comprising: in response to determining that the M objects cannot be retrieved, retrieving all unretrieved objects from the target placement group, filtering out objects with a time difference between the write time and the current time that is less than the fifth threshold, and adding the remaining objects as objects to be written to the write queue.

20. A non-transitory computer readable storage medium with computer instructions stored thereon, wherein the computer instructions are used for causing a method for data processing, wherein the method for data processing comprises:

determining a priority of each placement group in a cache pool respectively, and dividing placement groups with the same priority into a same waiting queue;

constructing a target queue which is initially empty, and in response to determining that a supplementary trigger condition is met, determining placement groups to be retrieved based on a principle that a placement group in a waiting queue with higher priority is retrieved first, retrieving the determined placement groups from its corresponding waiting queue and adding the retrieved placement groups to the target queue; and in response to determining that the target queue is not empty, iteratively traversing each placement group in the target queue, wherein when traversing each placement group, the placement group is used as a target placement group respectively, and a first quantity of writable objects is determined, and the first quantity of writable objects retrieved from the target placement group is written to a backend pool.

\* \* \* \* \*